United States Patent [19]

Ohkubo et al.

[11] Patent Number: 4,876,006
[45] Date of Patent: Oct. 24, 1989

[54] HOLLOW FIBER FILTER DEVICE

[75] Inventors: Kazuo Ohkubo; Tadamasa Hayashi; Hiroshi Nagai, all of Tokyo, Japan

[73] Assignee: Ebara Corporation, Tokyo, Japan

[21] Appl. No.: 186,707

[22] Filed: Apr. 19, 1988

Related U.S. Application Data

[63] Continuation of Ser. No. 915,232, Oct. 3, 1986, abandoned.

[30] Foreign Application Priority Data

Oct. 8, 1985 [JP] Japan .................................. 60-222860
Oct. 24, 1985 [JP] Japan .................................. 60-236402

[51] Int. Cl.⁴ ............................................. B01D 13/00
[52] U.S. Cl. ........................... 210/321.69; 210/321.89; 210/323.2; 210/333.01; 210/500.23
[58] Field of Search ....................... 210/321.69, 321.88, 210/321.89, 321.9, 323.2, 332, 333.01, 340, 438, 321.8, 321.81, 500.23; 55/158

[56] References Cited

U.S. PATENT DOCUMENTS

| | | |
|---|---|---|
| 520,293 | 5/1894 | Blackmore . |
| 671,003 | 4/1901 | Ruthenburg . |
| 1,771,928 | 7/1930 | Jung .............................. 210/333.01 |
| 2,570,132 | 10/1951 | Koupal . |
| 2,681,153 | 6/1954 | Armbrust ...................... 210/333.01 |
| 2,767,851 | 10/1956 | Muller . |
| 2,772,786 | 12/1956 | Gardes .......................... 210/333.01 |
| 2,834,473 | 5/1958 | Battey ............................ 210/333.01 |
| 3,280,978 | 10/1966 | Scott .............................. 210/333.01 |
| 3,419,144 | 12/1968 | Huntington ...................... 210/321.1 |
| 3,442,389 | 5/1969 | Mendelson ......................... 210/491 |
| 4,002,567 | 1/1977 | Konno et al. .................... 210/321.9 |
| 4,064,052 | 12/1977 | Zimmerly . |
| 4,352,736 | 10/1982 | Ukai et al. ....................... 210/323.2 |
| 4,411,785 | 10/1983 | Yu et al. ......................... 210/321.69 |
| 4,451,369 | 5/1984 | Sekino et al. .................... 210/323.2 |
| 4,540,490 | 9/1985 | Shibata et al. ................... 210/433.2 |
| 4,609,462 | 9/1986 | Flynn ............................. 210/323.2 |
| 4,610,789 | 9/1986 | Barch ............................... 210/405 |
| 4,622,143 | 11/1986 | Edwards ......................... 210/433.2 |

FOREIGN PATENT DOCUMENTS 8401522 4/1984 World Int. Prop. O. .

Primary Examiner—Frank Spear
Attorney, Agent, or Firm—Wenderoth, Lind & Ponack

[57] ABSTRACT

A hollow fiber filter device has a filter casing which is partitioned by a horizontal member into a filtered liquid chamber and a filtering chamber and a plurality of filter modules are suspended downwardly from the horizontal member. Each of the modules includes a plurality of hollow fibers having upper ends open to the filtered liquid chamber and also having lower ends open to a liquid collecting chamber which is sealed from the filtering chamber and is arranged to communicate with the filtered liquid chamber by way of a conduit so that the full length of the fiber is utilized for filtration.

10 Claims, 9 Drawing Sheets

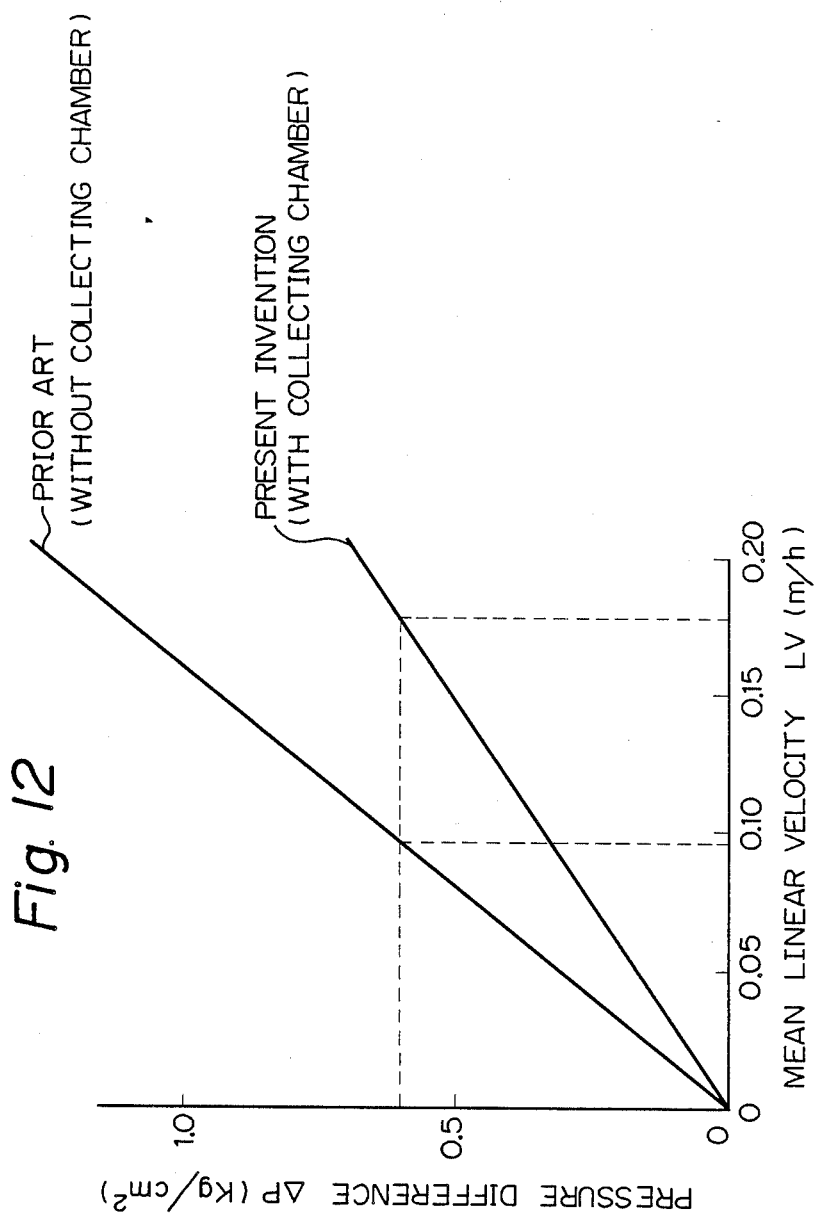

HOLLOW FIBER FILTER DEVICE

This application is a continuation of now abandoned application Ser. No. 915,232, filed Oct. 3, 1986.

BACKGROUND OF THE INVENTION

1. Field of the Invention

The present invention relates to a filter device and more particularly to a hollow fiber filter device used to filter liquid in which minute particles are suspended, for example return water (condensate recycled) in a nuclear power plant.

2. Description of the Related Art

In the conventional hollow fiber module for use in a filter, a plurality of hollow fibers are formed in a bundle and an upper end of the bundle is secured to a horizontal plate within the filter casing so that each fiber is open at the upper end while being closed at the lower end with a filling material inserted at that end or with two opposite ends thereof being open and positioned at the upper portion in such a manner that the overall configuration thereof is U-shaped. Thus, the construction of such a module has been achieved by securing one end of the bundle to a solid member while leaving the opposite end free so that the module may be handled by the solid member. In such a module as described above, some drawbacks have been encountered stemming from the free state of one end of the module, so a module for restraining the movement of the lower end of the bundle was devised as disclosed, for example, in copending U.S. application Ser. No. 868,050.

Consideration has also been given to increasing the filtering capacity of the module by making the length of the module longer so that the filtering capacity relative to the installation area of the filterring device may be improved.

However, it has been found that the capacity of the filtering device cannot be increased to the extent expected by lengthening the fiber module and mere lengthening of the module was in practice found to be relatively useless.

Accordingly, it has been desired to increase the filtering capacity with respect to a limited installation area.

SUMMARY OF THE INVENTION

It is an object of the present invention to provide a hollow fiber filter device having an increased filtering capacity relative to the installation area of the filter device.

The above object is accomplished by the present invention based on the recognition that the full length of the hollow fiber module is not utilized if its length extends beyond a certain limit.

The present invention has been conceived to utilize the full length of the fibers by providing means for enabling the filtered liquid to proceed upwardly as well as downwardly within the hollow fiber, this being achieved by providing a liquid collecting means at the lower ends of the hollow fibers and a means for achieving communication between a filtered liquid chamber and the liquid collecting means.

The present invention will become more clear when the ensuing description is reviewed in conjunction with the accompanying drawings, a brief explanation of which is summarized below.

BRIEF DESCRIPTION OF THE DRAWINGS

FIG. 12 is a graph showing a comparison between the present invention and the prior art.

DETAILED DESCRIPTION OF PREFERRED EMBODIMENTS

Before explaining the present invention, the results of investigations undertaken on the filtering capacity relative to the length of the fiber will be discussed.

Figure 1:
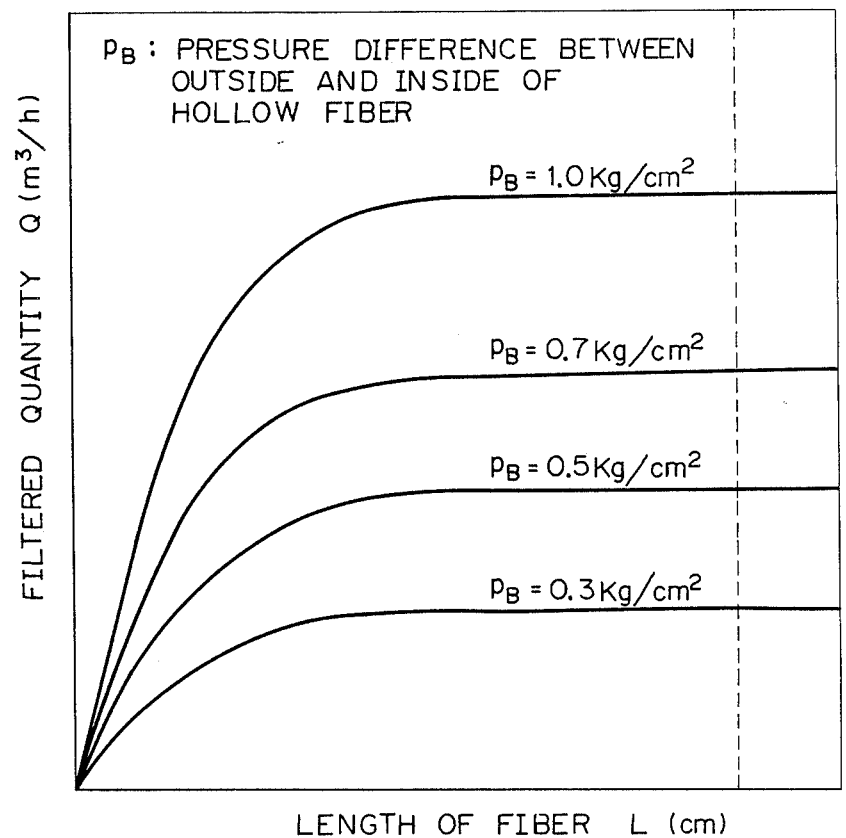
FIG. 1 is a graph showing the relationship between the filtering quantity and the length of the hollow fiber filter.

FIG. 1 shows the relationship between the filtered quantity and the length of the hollow fiber. As seen from FIG. 1, the filtered quantity increases as the length of the fiber is increased and the presure difference between the inside and the outside of the fiber is increased. However it is noted that even when the length is increased, no increase in the filtering quantity is seen where the length is increased beyond a certain dimension relative to any of the different pressures. So, from the review of this graph, it was found that the effective length of a hollow fiber is limited with respect to the filtering capacity thereof relative to a certain pressure difference.

Accordingly it was also noted that mere lengthening of the filter module necessiated a long filtering vessel without efficiently utilizing the full depth thereof. For example, in the case of a hollow filter fiber, the full length of which was 1200 mm and the inner diameter of which was 0.4~0.5 mm, it was found that approximately the upper 600 mm was effective while the lower 600 mm was substantially ineffective.

Figure 2:
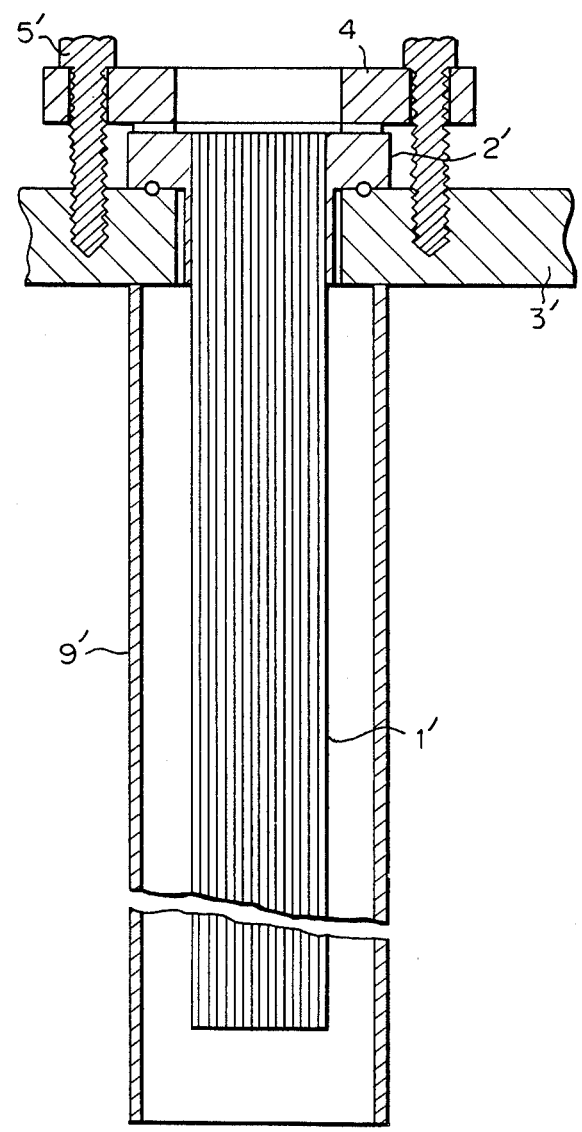
FIG. 2 illustrates a hollow fiber filter module of the prior art.

The fiber module of the prior art is illustrated in FIG. 2 wherein closed lower ends of fiber bundle 1' are free ends and the bundle 1' is encased within a protecting cylinder 9' and secured to a plate 2' with each fiber open at its upper end.

The fiber bundle plate 2' is secured within a filter casing to a tube plate 3' by means of a setting plate 4' and bolts 5'. The invention disclosed in the aforementioned U.S. application Ser. No. 868,050 improved the state of this module by providing means for restricting the lower end portion of the module. However, this did not solve the problem whereby, even if the length of the module is increased, the filtering capacity thereof is not increased.

Figure 3:
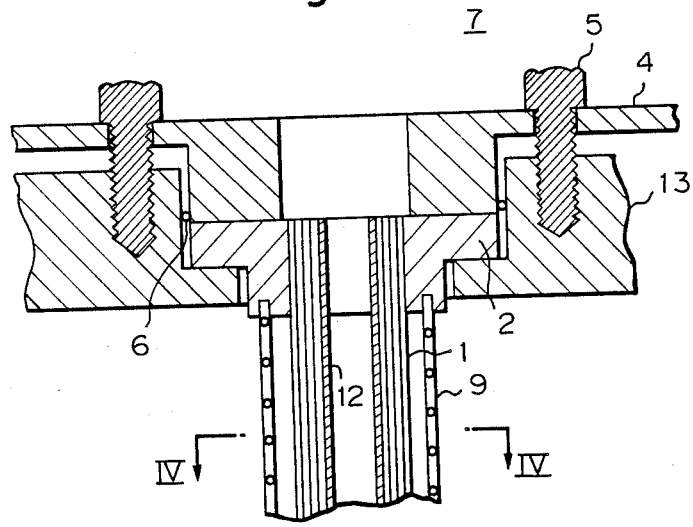
FIG. 3 is a schematic diagram showing a hollow fiber filter module according to the present invention.
Figure 4:
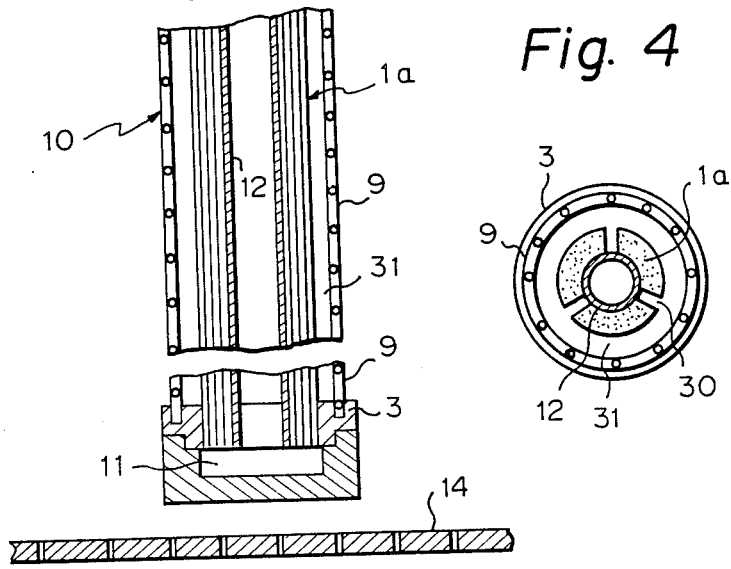
FIG. 4 is a cross-sectional view taken along the line IV—IV in FIG. 3.
Figure 5:
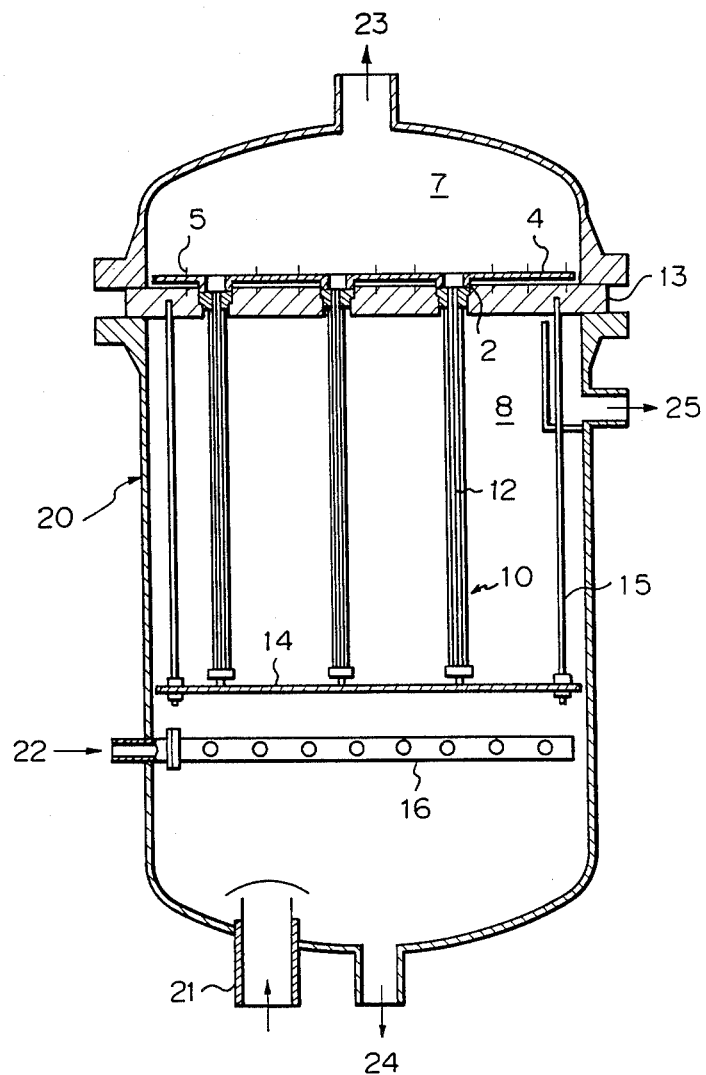
FIG. 5 is a longitudinal cross-sectional view of an overall arrangement of the filter device according to the present invention.

Referring now to FIGS. 3 and 4, there is schematically shown a hollow fiber filter module 10 suspended from a tube plate 13 within a filter casing 20 (FIG. 5). The module 10 comprises a bundle 1a of hollow fibers 1, an upper fiber bundle plate 2, a lower fiber bundle plate 3, a protecting outer cylinder 9, a liquid collecting chamber 11 and a conduit 12. The bundle 1a is secured to the upper bundle plate 2 and the lower fiber bundle plate 3 at its upper and lower ends, respectively, with each end of the fibers being open. The opposite ends of the conduit are secured to the upper and lower fiber bundle plates 2 and 3 while the conduit 12 and the collecting chamber 11 are arranged to form a liquid passage from the lower end openings of the bundle 1a through the chamber 11 and the inside of the conduit 12 to the upper side of the fiber bundle plate 2 where the fibers 1 are all open. To such end, the collecting chamber 11 is naturally sealingly coupled to the lower bundle plate 3. The protecting cylinder 9 is made of a screen or mesh material and is coupled at opposite ends to the upper and lower plates 2 and 3, respectively. The module 10 is vertically installed through a hole in a separating member or tube plate 13 in the casing 20 and is secured in place by means of a clamping plate 4 and fastening bolts 5. The separating member 13 separates the inside of the casing into a filtering chamber 8 and a filtered liquid chamber 7, both chambers being sealed with respect to each other by sealing means such as "O" rings 6.

An overall view of the filter device incorporating the plural modules 10 is schematically illustrated in FIG. 5.

In the filtering operation, the liquid to be filtered is introduced into the filtering chamber 8 through an intake port 21 and penetrates through the walls of fibers 1 into the inside of the respective fibers leaving suspended minute particles in the form of cake on the outer surfaces of the fibers. The filtered liquid inside of the respective fibers 1 is partially directed upwardly to the filtered liquid chamber 7 directly and the remaining part of the filtered liquid is directed downwardly to the collecting chamber 11 and hence directed upwardly through the conduit 12 into the chamber 7. It is assumed that the filtered liquid diverges at an approximately central point of the length of the fiber so that the full length of the fiber may become effective for filtration.

It is noted that the conduit 12 is arranged to have a resistance to liquid flowing therethrough which is smaller than the total resistance of all the fibers to the liquid flowing through the fibers.

By virtue of the characteristic arrangement of the conduit 12 and the liquid collecting chamber 11, it is made possible to effectively use a longer fiber. Accordingly, the following advantages are provided by the use of the fiber filter module 10 explained above;

①. A pressure difference between the outside and the inside of the respective fiber is effectively utilized over substantially the entire length of the fiber in the filter module;

②. Resistance to liquid flowing through the inside of the fibers is maintained at a small value even when the length of the fiber is increased; and ③. There is a possibility of lengthening the filter device by coupling plural modules in the longitudinal direction, thereby increasing the filtering capacity relative to the installation area.

Below the modules 10, an air distributor plate 14 is disposed by being suspended from the separating plate 13 with plural supporting bars or tie rods 15 and, below the distributor plate 14, air injection pipes 16 are provided which are coupled to an air inlet port 22. The functions of the distributor plate 14 and pipes 16 will be explained later in connection with the backwashing of the device. The filtered liquid delivered to the chamber 7 is directed outwardly through an outlet port 23. At the lower part of the chamber 8, a discharge port 24 is provided for discharging the backwasing water and an air discharge port 25 is provided at the upper part of the chamber 8 for discharging air used for air scrubbing in the backwashing process.

Gaps identified as 30 and 31 in FIGS. 3 and 4 form spaces which are useful at the time of backwashing and these will be explained later. While no gap is shown in FIG. 4 between the conduit 12 and the bundles 1a, it is possible or preferable to provide gaps therebetween.

Figure 6:
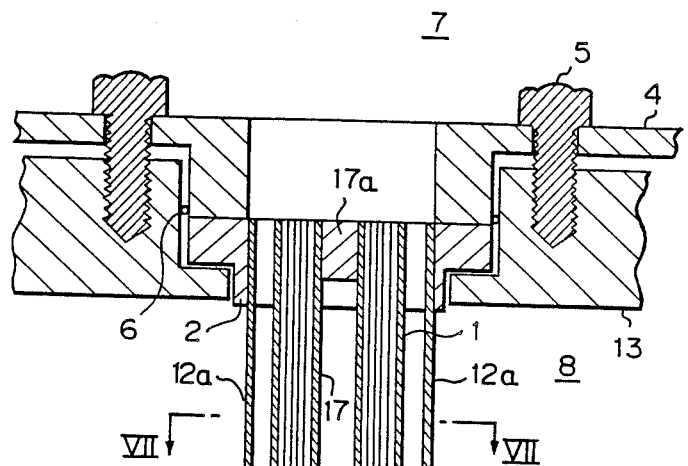
FIG. 6 is a schematic diagram showing a hollow fiber filter module similar to that shown in FIG. 3 but wherein the arrangement is somewhat modified.
Figure 7:
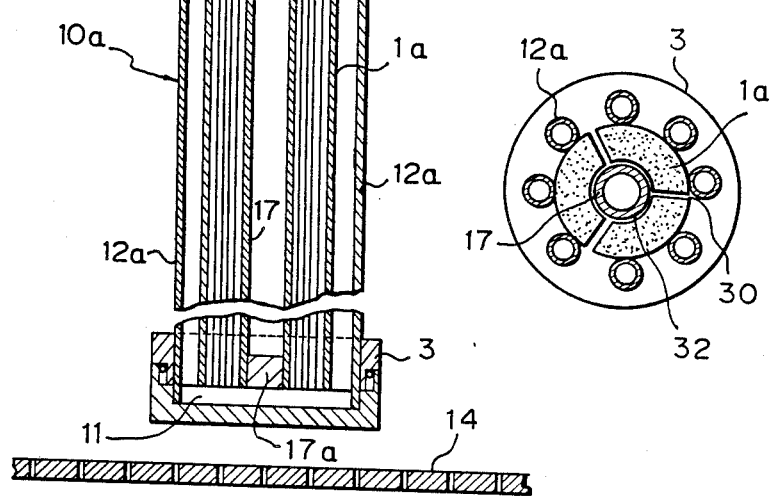
FIG. 7 is a cross-sectional view taken along the line VII—VII in FIG. 6.

In the embodiment shown in FIGS. 3 and 4, although the conduit 12 is illustrated as being disposed centrally relative to the plural fibers, the arrangement is not limited to that illustrated in FIGS. 3 and 4. A modified arrangement is schematically illustrated in FIGS. 6 and 7 wherein the same reference numerals are used to designated elements having the same function as in the foregoing description.

In this modified module 10a, instead of the central conduit 12 shown in FIGS. 3 and 4, a plurality of conduits 12a are disposed outside of the fiber bundles 1a, preferably spaced by an equidistant peripheral pitch around the bundles 1a. In order to reinforce the module, a pipe 17 is disposed centrally, the opposite ends of which are secured to the upper and lower bundle plates 2 and 3, respectively, with plugs 17a and 17a provided to block the pipe 17. The bundles 1a and the pipe 17 may be disposed with or without a gap 32 therebetween. Also, the plural conduits 12a may be spaced from or in contact with the bundles 1a. If the plural conduits 12a are provided as shown in FIGS. 6 and 7, the protecting cylinder, such as that denoted by 9 shown in FIGS. 3 and 4, may be omitted. The inner diameter and number of the conduits 12a are preferably determined such that the total resistance to the liquid flowing through the conduits 12a is smaller than the total resistance in all of the fibers.

After the filtering operation has been continued for a certain period, minute particles suspended in the liquid will be left on the outer surface of the hollow fibers so that the resistance of filtration is increased. Accordingly it is necessary to stop filtration and remove the caked particles from the fiber.

Such removal is effected by introducing pressurized water from the port 23 into the chamber 7 for backwashing the modules 12. The pressurized water then passes through the inside of the hollow fibers and part of the water passes through the inside of the conduit 12 or conduits 12a and the collecting chamber 11 before entering the inside of the fibers. Thereafter with the water filled inside the filter casing 20, air scrubbing is effected by passing air through the air inlet port 22, the injector pipes 16 and the distributor 14. The distributor 14 properly distributes air bubbles to the fiber modules 10. The injected air bubbles vibrate the fibers to facilitate the removal of the particles caked on the fiber surface which were loosened by the pressurized water backwardly supplied from the port 23. It should be noted that the bundles 1a are not tightly stretched between the upper and lower fiber bundle plates 2 and 3, so as to allow vibration to occur when subjected to air scrubbing. While the bundles 1a are being vibrated, they are not entangled or broken because there is no free end as in the prior art, but rather the opposite ends thereof are secured to the fiber bundle plates.

If the diameter or dimension of the bundles 1a is made large, there is a possibility that the removed cake may not easily move to the outside of the bundles 1a, thereby degrading the backwashing efficiency. In order to prevent such degrading or improve the backwashing efficiency, it is preferable to provide a gap between the conduit 12 (conduits 12a) and the fiber bundles 1a, a gap 30 between adjacent bundles 1a, a gap 31 between bundles 1a and the protecting cylinder 9 and/or a gap 32 between the reinforcing pipe 17 and the bundles 1a. The dimension of these gaps may be appropriately selected, for example, in a range between 2 and 10 mm.

Figure 8:
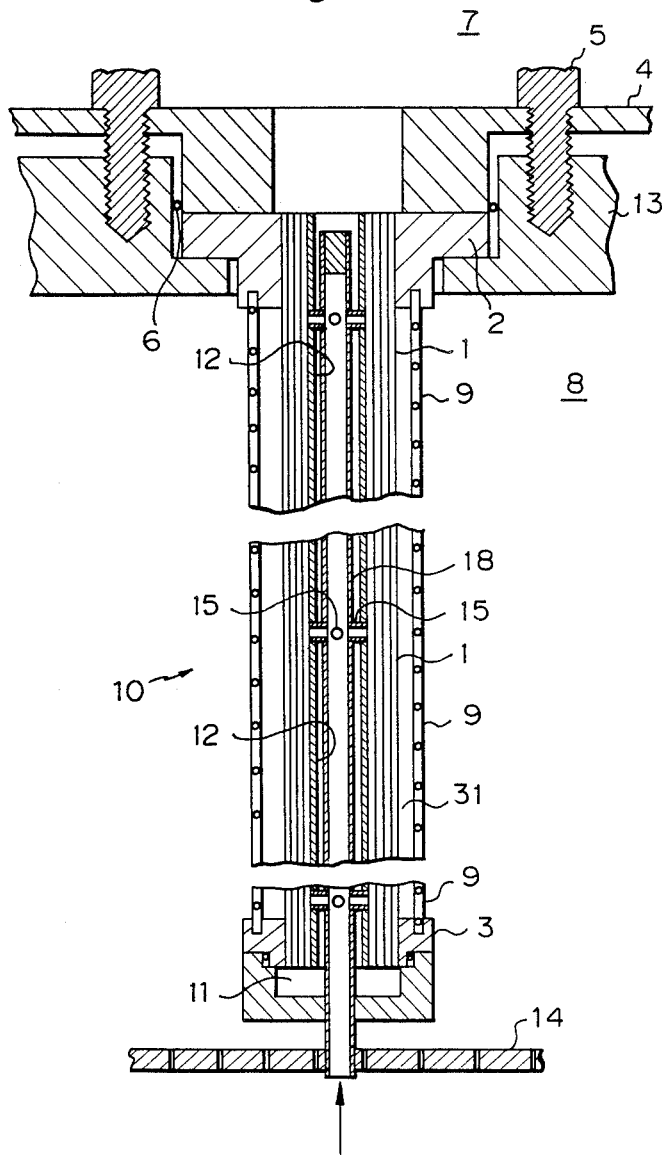
FIG. 8 is a schematic diagram showing a modified form of a hollow fiber filter module according to the present invention into which an air pipe is incorporated.

When the dimension of the bundles 1a is large, it is preferable to provide an air pipe or plural air pipes 18 provided with plural air injection nozzles 15 outside the conduit 12 as schematically shown in FIG. 8, the pipe or pipes 18 being plugged at the top and open at the bottom thereof. With the provision of the air injection nozzles 15 extending into the air pipe 18, air bubbles injected through the nozzles promote the removal of cakes particles from the fibers. It is further preferable to dispose nozzles 15 adjacent the upper and lower bundle plates 2 and 3 so that the sedimentary deposit of particles on these plates may be removed by the air injected from the nozzles 15. Alternately, the conduit 12 may be disposed inside the air pipe 18. In the case of the modified module such as that shown in FIGS. 6 and 7, the reinforcing pipe 17 may be modified as an air pipe similar to the pipe 18.

Further modified forms of the modules and related portions are explained hereinafter.

Figure 9:
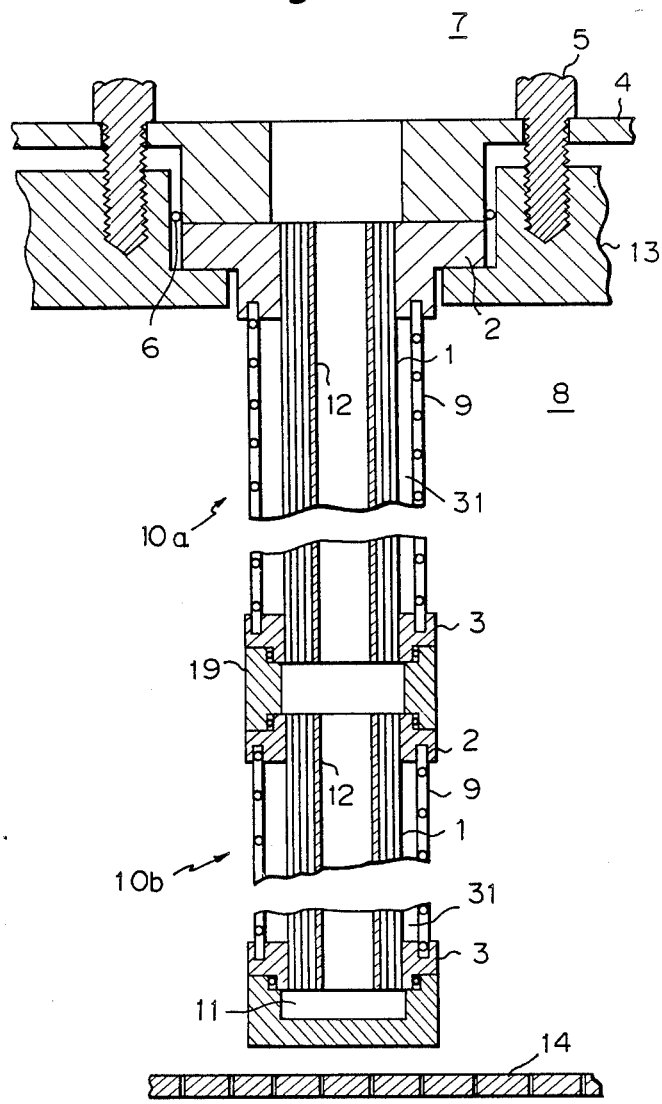
FIG. 9 is a schematic diagram showing two filter modules according to the present invention coupled in the longitudinal direction.

FIG. 9 schematically shows fiber modules 10a and 10b similar to the module 10 shown in FIG. 3 that are coupled lengthwise by an intermediate collecting chamber 19. The reference numerals which are the same as those in FIG. 3 designate elements having a function which is similar to that shown in FIG. 7. Since the fiber 1 in each of the modules 10a and 10b provide communication between the upper chamber and the lower chamber, the full length of the fiber will be effective for filtration and, therefore, this arrangement makes it possible to further lengthen the fiber filter modules in the longitudinal direction which contributes to an increase in the filtering capacity relative to the installation area. If necessary, the number of intermediate chambers 19 provided may be increased so that the number of filter modules coupled together may also be increased.

Modifications similar to those shown in FIGS. 6 and 7 (plural conduits 12a) and FIG. 8 (air pipe 18 and nozzle 15) may also be applicable to the embodiment shown in FIG. 9.

It is noted that in all of the embodiments explained above the caked particles removed at the time of backwashing and air scrubbing are directed outwardly from the fiber bundles 1a. However, an alternative modification of the fiber module makes it possible to direct the removed particles inwardly as well as outwardly relative to the fiber bundles.

Figure 10:
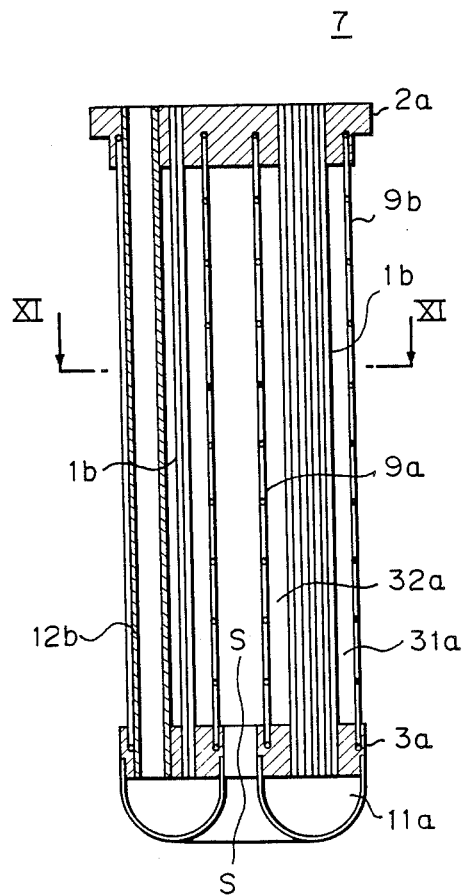
FIG. 10 is a schematic diagram showing a further modified hollow fiber filter module useful in the present invention.
Figure 11:
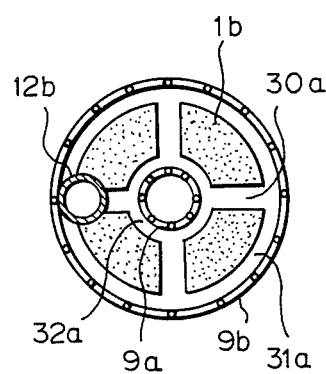
FIG. 11 is a cross-sectional view taken along the line XI—XI in FIG. 10.

A typical example of this is shown in FIGS. 10 and 11.

The fiber bundles 1b are secured at their opposite ends to an upper bundle plate 2a and a lower bundle plate 3a in a manner similar to the module 10 shown in FIG. 3. Below the lower bundle plate 3a, an annular collecting chamber 11a is sealingly coupled to the lower bundle plate 3a, and is ring shaped or annular in this case. The bundles 1b are surrounded by an inner protecting cylinder 9a and an outer protecting cylinder 9b which are mesh or screen and are connected to the upper and lower fiber bundle plates 2a and 3a, respectively. In this example, a conduit 12b is eccentrically disposed so as to place the annular collecting chamber 11a in communication with the filtered liquid chamber 7. With the arrangement explained above, the particles removed by the backwashing and air-scrubbing may move outwardly through the outer cylinder 9b from the bundles 1b through gaps 30a and 31a as well as inwardly towards a space S through gaps 31a and 32a and through the screen of the inner protecting cylinder 9a.

The particles removed, as discussed above, are discharged through the port 24.

In order to further assist the understanding of the present invention, comparative data between the present invention and the prior art is shown in FIG. 12.

In FIG. 12, the abscissa indicates a mean linear velocity (LV) of liquid passing through the fiber bundle and the ordinate indicates the pressure difference ($\Delta P$) between the filtering chamber (e.g. 8 in FIG. 5) and the filtered liquid chamber (e.g. 7 in FIG. 5). The mean linear velocity (LV) is defined as a ratio of the total quantity of liquid passing through the hypothetical outside surface of the fiber bundle (e.g. 1a in FIG. 3). In this data, a fiber having an inner diameter of 0.3 mm, an outer diameter of 0.5 mm and a length of 1 m was employed. For example, with a $\Delta p = 0.6$ kg/cm$^2$, LV is observed as 1.78 m/h in the present invention, while in the prior art having no collecting chamber, it is observed as 0.98 m/h. Accordingly, the filter device of the present invention is capable of processing the liquid 1.85 times (1.78/0.98 = 1.85) faster than that processed in the prior art. This fact also allows the device to be made compact.

The present invention provides a great improvement in the filtering capacity of a hollow fiber filter device as explained above.

The present invention has been explained in detail by referring to particular embodiments. However, it is not limited to those explained above and may be modified or changed by those skilled in the art within the scope and spirit of the present invention defined in the appended claims.

What is claimed is:

1. A hollow fiber filter device comprising:
   a filter casing, a separating plate extending across said casing for separating the casing into a filtering chamber defined on one side of said plate and a filtered liquid chamber on the other side of said plate, an inlet port extending through said filter casing and in communication with said filtering chamber, and an outlet port extending through said filter casing and in communication with said filtered liquid chamber;
   a plurality of filter modules each extending from said separating plate into said filtering chamber,
   each of said filter modules comprising a fiber bundle plate supported on said separating place, a plurality of elongated hollow fibers connected to and extending from said fiber bundle plate into said filtering chamber, said fibers having respective open first ends open to said filtered liquid chamber and respective open second ends opposite said first ends, a space forming means enclosing said second ends of said fibers and spaced therefrom for establishing a space open to said second ends that is sealed from said filtering chamber, a single pipe operatively connected to said fiber bundle plate and extending through a central portion of said plurality of fibers and between said fibers bundle plate and said space forming means for placing said space in communication with said filtered liquid chamber, and an air pipe extending through said single pipe;

an air injection pipe in said filtering chamber for introducing air into said filtering chamber;

an air distributor plate disposed in said filtering chamber between said modules and said air injection pipe for distributing the air introduced into said filtering chamber by said air injection pipe over an area at which said modules are disposed; and said air pipe having a closed first end, an open second end extending through said space forming means and through said air distributor plate, and plural air injection nozzles extending through and open at the exterior of said single pipe.

2. A hollow fiber filter device as claimed in claim 1, wherein said air injection nozzles extend at respective locations disposed between said fiber bundle plate and said space enclosing means.

3. A hollow fiber filter device as claimed in claim 2, wherein said locations include locations adjacent said fiber bundle plate and said space enclosing means.

4. A hollow fiber filter device as claimed in claim 3, wherein said air pipe is supported on said single pipe through said nozzles.

5. A hollow fiber filter device as claimed in claim 2, wherein said air injection nozzles extend radially outwardly from said air pipe at each of said respective locations.

6. A hollow fiber filter device as claimed in claim 5, wherein said air pipe is supported on said single pipe through said nozzles.

7. A hollow fiber filter device as claimed in claim 3, wherein said air injection nozzles extend radially outwardly from said air pipe at each of said respective locations.

8. A hollow fiber filter device as claimed in claim 2, wherein said air pipe is supported on said single pipe through said nozzles.

9. A hollow fiber filter device as claimed in claim 1, wherein each of said filter modules includes means defining a plurality of radial gaps extending radially through the plurality of elongated hollow fibers thereof, and also defining either a central gap extending between said single pipe and said plurality of elongated hollow fibers or a peripheral gap extending at the outer periphery of said plurality of elongated hollow fibers for establishing a space at which the outer periphery of said fibers is exposed.

10. A hollow fiber filter device as claimed in claim 1, wherein each of said modules comprises an upper module portion and a lower module portion, said plurality of fibers of each said module include a plurality of fibers extending in said upper module portion and a plurality of fibers extending in said lower module portion, and said space forming means of each of said modules comprises an intermediate space forming means and a lower space forming means, said intermediate space forming means disposed between said upper module portion and said lower module portion for coupling said upper module portion to said lower module portion and for enclosing an intermediate space which is open between lower ends of said plurality of fibers extending in said upper module portion and upper ends of said plurality of fibers extending in said lower module portion, said lower space forming means enclosing lower ends of the plurality of fibers extending in said lower module portion and spaced therefrom for establishing a lower space therebetween, said intermediate space open to said filtered liquid chamber and said lower space via said single pipe.

* * * * *